United States Patent
Nathan et al.

(10) Patent No.: US 7,460,005 B2
(45) Date of Patent: *Dec. 2, 2008

(54) SEAT FOLDING SYSTEM WITH RADIO FREQUENCY LIMITED TARGETED ZONES FOR VERIFYING OPERATOR PRESENCE

(75) Inventors: John F. Nathan, White Lake, MI (US); Tom Q. Tang, Novi, MI (US); Riad Ghabra, Dearborn Heights, MI (US)

(73) Assignee: Lear Corporation, Southfield, MI (US)

( * ) Notice: Subject to any disclaimer, the term of this patent is extended or adjusted under 35 U.S.C. 154(b) by 512 days.

This patent is subject to a terminal disclaimer.

(21) Appl. No.: 11/161,030

(22) Filed: Jul. 20, 2005

(65) Prior Publication Data

US 2007/0018840 A1    Jan. 25, 2007

(51) Int. Cl.
*H04B 1/38* (2006.01)
(52) U.S. Cl. ..................................... 340/5.61
(58) Field of Classification Search .............. 297/378.1; 340/5.61, 825.28, 825.29, 825.71, 825.72, 340/667, 5.24, 5.72, 825; 318/16, 266, 286
See application file for complete search history.

(56) References Cited

U.S. PATENT DOCUMENTS

| | | | |
|---|---|---|---|
| 5,482,314 A | 1/1996 | Corrado et al. | |
| 5,570,903 A | 11/1996 | Meister et al. | |
| 5,678,854 A | 10/1997 | Meister et al. | |
| 5,712,625 A | 1/1998 | Murphy | |
| 5,822,707 A | 10/1998 | Breed et al. | |
| 6,240,352 B1 * | 5/2001 | McCurdy | 701/45 |
| 6,250,672 B1 | 6/2001 | Ryan et al. | |
| 6,369,459 B1 * | 4/2002 | Stevens | 307/10.3 |
| 6,369,529 B1 | 4/2002 | McClintock et al. | |
| 6,455,948 B1 | 9/2002 | Berger | |
| 6,540,295 B1 | 4/2003 | Saberan et al. | |
| 6,557,424 B1 | 5/2003 | Morell | |
| 6,677,538 B2 | 1/2004 | Cook, Jr. et al. | |
| 6,714,019 B2 | 3/2004 | Kiribayashi et al. | |
| 6,789,003 B2 | 9/2004 | Magner et al. | |
| 6,845,339 B2 | 1/2005 | Winkler et al. | |
| 7,289,035 B2 * | 10/2007 | Nathan et al. | 340/667 |
| 2003/0117295 A1 * | 6/2003 | Okada | 340/825.72 |
| 2003/0137462 A1 * | 7/2003 | Ghabra et al. | 343/711 |
| 2003/0231550 A1 | 12/2003 | Macfarlane | |
| 2004/0195892 A1 * | 10/2004 | Daniels | 297/378.1 |

(Continued)

FOREIGN PATENT DOCUMENTS

FR      2696384      4/1994

(Continued)

*Primary Examiner*—Brian A Zimmerman
*Assistant Examiner*—Nabil H Syed
(74) *Attorney, Agent, or Firm*—Brooks Kushman P.C.

(57) ABSTRACT

A folding system for a vehicle seat is disclosed that includes a Rf transmitter that is associated with the seat and a receiver that polls a portable transmitter/receiver whenever it is within a targeted zone near the rear door, right side door, or left side door. Weight sensing sensor arrays in the folding seat are used to prevent folding the seat when a foreign object is disposed in the seat. A Rf receiver may be provided either as part of the vehicle seat or the Rf receiver of a remote keyless entry system can be used that communicates with the seat through a vehicle bus.

15 Claims, 3 Drawing Sheets

U.S. PATENT DOCUMENTS

| | | |
|---|---|---|
| 2004/0263154 A1 | 12/2004 | Young et al. |
| 2005/0090279 A9* | 4/2005 | Witkowski et al. ....... 455/550.1 |
| 2005/0168035 A1 | 8/2005 | Boudinot |
| 2006/0279467 A1* | 12/2006 | LeMense et al. ............ 343/711 |

FOREIGN PATENT DOCUMENTS

| | | |
|---|---|---|
| GB | 2334673 | 9/1999 |
| GB | 2419524 | 5/2006 |

\* cited by examiner

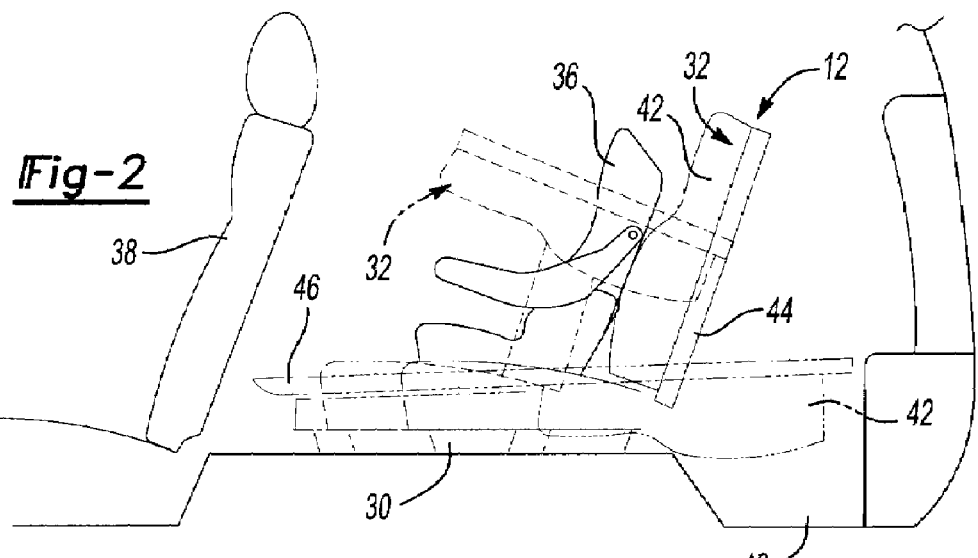
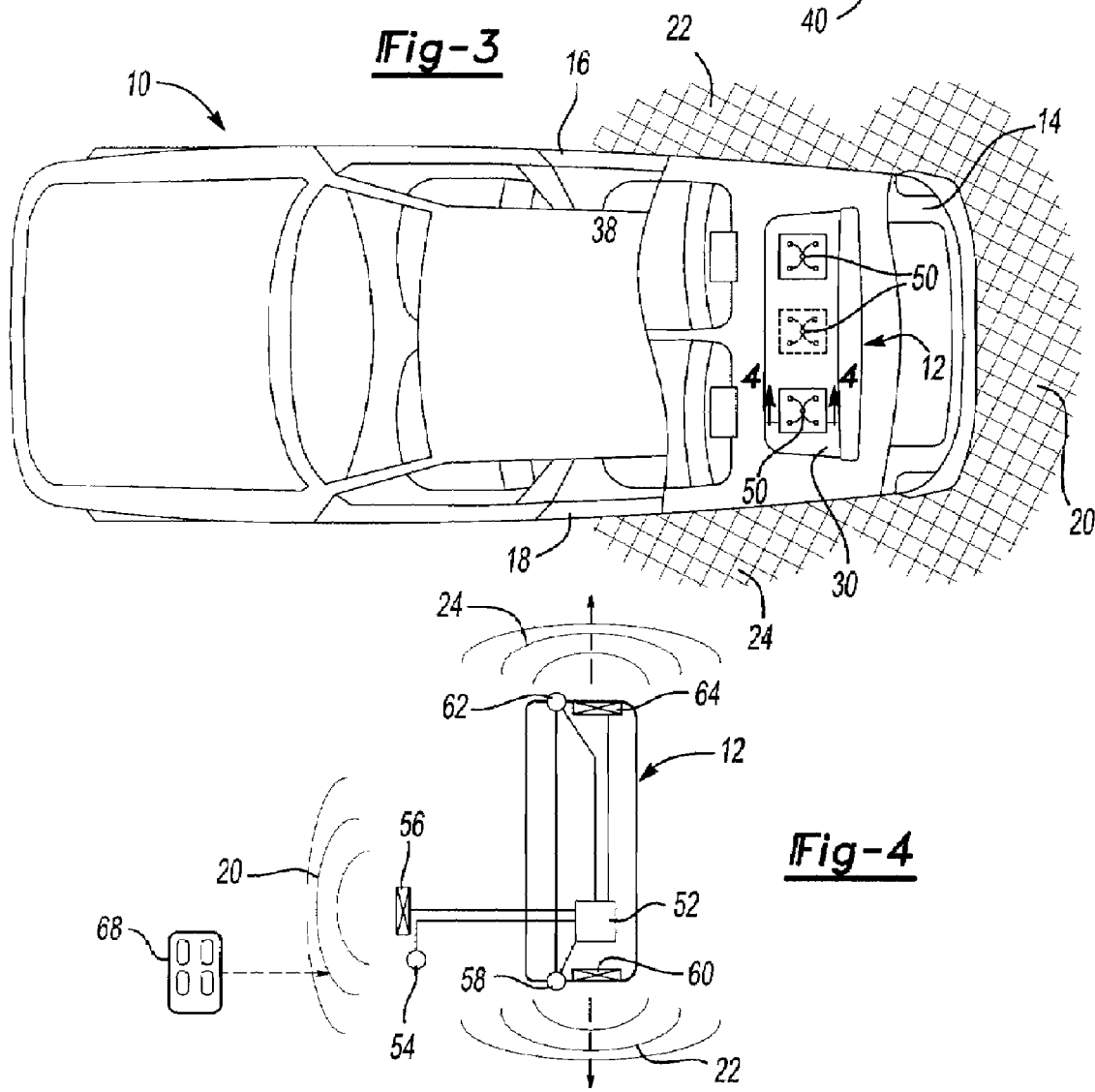

SEAT FOLDING SYSTEM WITH RADIO FREQUENCY LIMITED TARGETED ZONES FOR VERIFYING OPERATOR PRESENCE

BACKGROUND OF THE INVENTION

1. Field of the Invention

The present invention relates to an electronic control system for a vehicle seat that is convertible between different positions such as a seat position and a load floor position.

2. Background Art

A wide variety of vehicle seating arrangements are available for vans, minivans, and sport utility vehicles ("SUVs"). Vehicle seating systems may add versatility to vehicles that is derived from the ability to provide different seating configurations. Vehicle seating systems may include seats that are used in a conventional seating configuration or may be converted to provide a full or a partial load floor for hauling cargo. Some minivans are provided with removable seats that are releasably connected to anchoring devices secured to the vehicle compartment pan. More recently, seats are available that may fold into recesses in compartment pans to provide a continuous load floor without the need to remove the seats from the vehicle. Some seats are foldable into a console position with the seatback being folded forward over the seat base.

Most vehicle seating systems are manual and require a person to release a lever and reposition various portions of the seat to convert the seat to different modes. A recent innovation is the introduction of power folding seats such as that disclosed in U.S. Pat. No. 6,540,295 that is assigned to the assignee of this application. The power folding seat disclosed in this patent includes an electric motor that rotates the seat back between an upright, slanted seat back position and a generally horizontal load floor position. The motor used to fold the seat may be provided with a voltage regulator that monitors the voltage across the motor that may increase if a foreign object is encountered by the seat as it is moved by the motor. If a foreign object is contacted by the seat, the seat folding mechanism may attempt to continue the folding operation until the motor stalls. The motor stall condition is detected by the voltage regulator that interrupts operation of the motor. The '295 patent also discloses the concept of operating the power folding seat upon receipt of an Rf signal from an Rf transmitter such as a key fob. The '295 patent also discloses that location sensors may be provided upon various parts of the seat structure to be sure that the movable panels of the seat system are in the proper position for a given folding operation.

The seat system disclosed in the '295 patent is currently in production as the 2005 Cadillac SRX® sport utility vehicle. As currently produced, the seat has a manually actuated switch that must be held in to complete the folding operation. If the operator releases the switch during the folding operation, the seat folding operation is immediately interrupted to prevent damage to the seat folding mechanism or objects located on or around the seat. Some customers have indicated the desire to provide a power folding seat that does not require them to continuously hold the seat actuation button during the seat folding operation. Yet it is desirable to have an operator near a power folding seat as it folds to avoid problems that may be observed by a person as the seat is folded and unfolded. There is a need for a power seat folding system that does not require an operator to continuously hold a switch during an entire seat folding operation but will not operate unless the person is within close proximity to the vehicle during the folding operation.

Another problem associated with power seat folding mechanisms is that no feedback is typically provided to a user in the event the seat folding operation is unsuccessful. If, for example, the seat folding mechanism engages a foreign object and the motor stalls, the operator may not understand why the seat folding operation was interrupted. The operator may not understand why the seat did not completely fold if the seat folding operation begins, but then terminates because the operator failed to continue to hold the button in during the entire folding operation. An operator may return the vehicle for service when no service is actually necessary if they do not understand why the seat folding operation was interrupted. There is a need for a power folding seat system that provides feedback to an operator in the event a seat folding operation is interrupted or to confirm that a seat has been moved to its fully folded or fully upright position for use as a seat.

These and other problems are addressed by Applicants' invention as summarized below.

SUMMARY OF THE INVENTION

According to one aspect of the present invention, a system is provided for controlling movement of a seat in a vehicle that has a power seat folding apparatus. The power seat folding apparatus is powered by a motor that is controlled by an electronic control module. The system for controlling movement of the seat comprises a radio frequency (Rf) transmitter and receiver system that may be attached or otherwise associated with the seat. A portable key fob Rf transmitter and receiver unit is in communication with the Rf transmitter and the receiver system when the unit is within at least one targeted zone relative to the vehicle. A signal is provided to the electronic control module during operation of the power folding seat when the portable unit is in a targeted zone. The power seat folding apparatus may continue to operate as long as the signal is received by the electronic control module. If the portable transmitter and receiver unit is removed from the targeted zone, the electronic control module interrupts operation of the power driven folding apparatus.

According to other aspects of the present invention, the Rf transmitter and the receiver system may repeatedly poll the portable Rf transmitter and receiver unit to verify that the portable Rf transmitter and receiver unit is within the targeted zone. For example, the portable Rf transmitter and receiver unit may be polled by the Rf transmitter and receiver system by sending a low frequency signal to the portable Rf transmitter and receiver unit that responds with a UHF response signal.

According to another object of the present invention, movement of the seat may be prevented in the event an ignition key is inserted and remains in the vehicle ignition switch.

According to another aspect of the invention, at least one manually actuated switch may be actuated to initiate operation of the power driven folding apparatus wherein the operation of the power driven folding apparatus continues until completed unless the portable Rf transmitter and receiver unit is moved out of targeted zone. The portable Rf transmitter and receiver unit may have a plurality of manually actuated switches and may be programmed so that any one of the switches may be actuated at any time to stop operation of the folding apparatus during operation thereof. At least one of the manually actuated switches or vehicle mounted switch may be actuated to override the power driven folding seat operation and allow manual folding of the seat.

According to other aspects of the invention, the vehicle Rf transmitter and receiver system may have a switch that may be actuated during operation of the power driven folding apparatus to stop operation of the folding apparatus.

According to other aspects of the present invention, an operator perceptible output mechanism may be used to communicate status information regarding the status of the power driven folding apparatus in the event operation of the power driven folding apparatus is interrupted. The operator perceptible output mechanism may be a display panel on the portable Rf transmitter and receiver unit, a display panel on the vehicle, or an audio output such as a audio signal or other warning message communicated by other mechanisms.

According to other aspects of the invention, right, left, and rear antennas may be secured to the vehicle seat adjacent to or near a right side door, a left side door, and a rear door, respectively. The antennas may be used to establish a targeted zone near the right door, left door, and rear door of the vehicle. An Rf receiver system is also provided in the vehicle. A portable transmitter/receiver communicates with the transmitter and receiver of the vehicle when in one of the targeted zones. The portable transmitter/receiver provides a signal to the vehicle receiver that communicates to the electronic control module which permits operation of the seat folding apparatus.

In one embodiment of the invention, the vehicle Rf transmitter and receiver system may provide remote keyless entry operated by a key fob in an active mode from a distance that is outside the targeted zone. The vehicle Rf transmitter and receiver system may also provide passive communication between the key fob and the vehicle Rf transmitter and receiver system. The receiver system may be disposed at a location on the vehicle that is remote from the seat.

These and other aspects of the present invention will be better understood in view of the attached drawings and following detailed description of the illustrated embodiment of the invention.

BRIEF DESCRIPTION OF THE DRAWINGS

FIG. 2 is a diagrammatic side elevation view of the rear seat of a vehicle having a child seat disposed in the rear seat and also showing the rear seat in several different positions;

FIG. 3 is a partially fragmented plan view of a vehicle having three rows of seats with the third row of seats being provided with an array of weight sensors;

FIG. 4 is a diagrammatic view of a rear seat having three antennas for establishing Rf communication with an Rf device within three targeted zones;

DETAILED DESCRIPTION OF THE PREFERRED EMBODIMENT(S)

Figure 1:
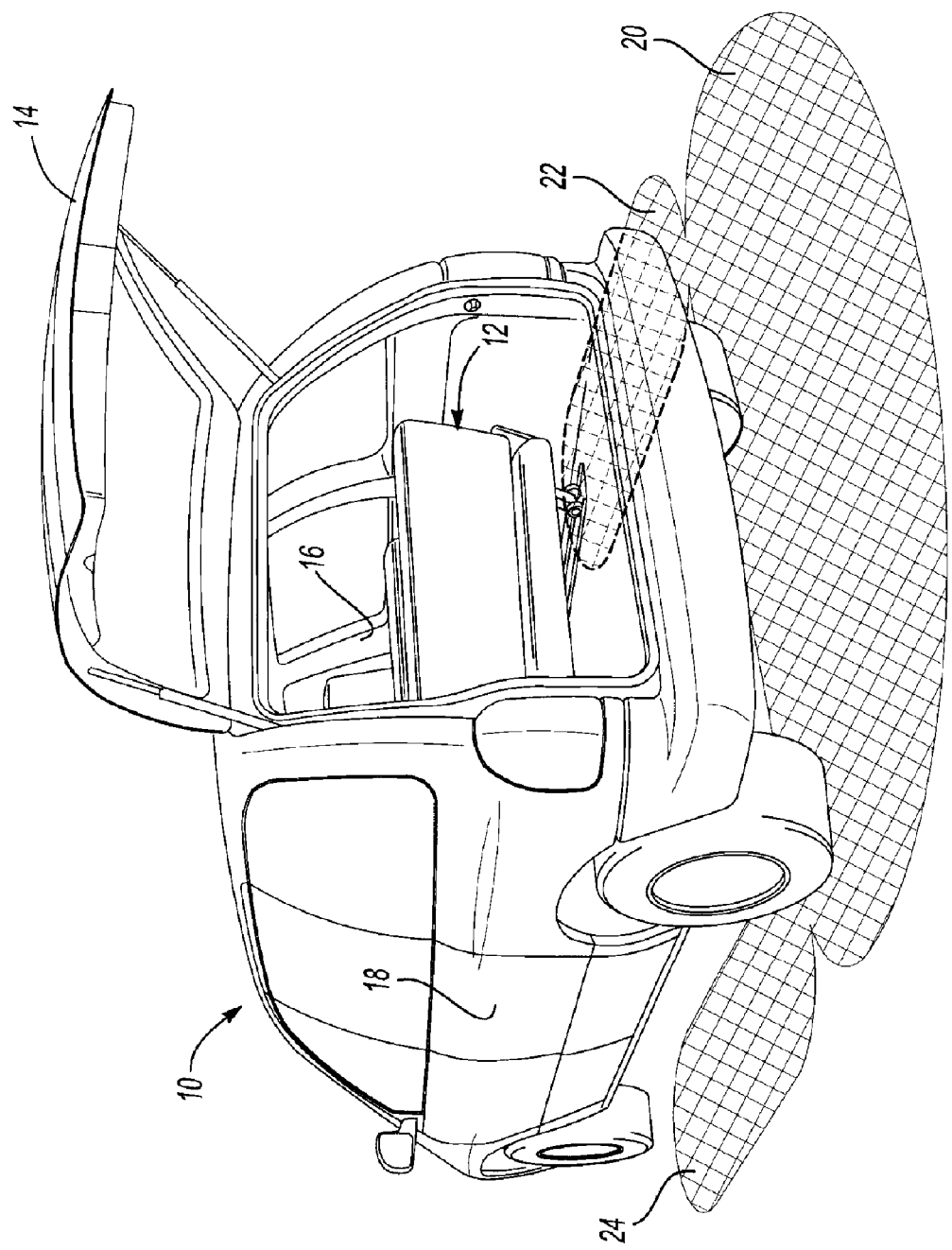
FIG. 1 is a rear perspective view of a mini-van showing the rear seat/cargo area and targeted zones within which operation of the seat folding mechanism may be observed.

Referring to FIG. 1, a vehicle 10, such as a mini-van, is illustrated with the third row seat 12 being visible through the rear door 14. The vehicle 10 also has a right side door 16 and a left side door 18. The rear door and left and right side doors 14-18 are the doors through which the third row seat 12 may be conveniently accessed. A rear targeted zone 20, right targeted zone 22, and left targeted zone 24 are illustrated by crosshatching on the ground near the rear door 14, right side door 16, and left side door 18. While the targeted zones are illustrated on the ground next to the vehicle, it should be understood that the targeted zone extends upwardly from the crosshatched area to a limited extent. The targeted zones 20-24 are provided near the third row seat 12 and correspond to areas in which a person may stand and watch the folding operation of the third row seat 12. As will be more fully described below, a person wishing to operate the third row seat 12 during its folding operation is required to retain an Rf transmitter and receiver, such as a key fob, within one of the targeted zones to initiate and to continue folding or unfolding of the rear seat 12.

Referring to FIG. 2, the third row seat 12 is shown to include a base 30 and a back 32. A child seat 36 is shown installed on the third row seat 12. A set of second row seats 38 are illustrated forward of the third row seat 12 and child seat 36. A rear stowage well 40 is provided rearward of the third row seat 12. The back 32 is provided with a foam seat back cushion 42 on one side and a load floor segment 44 is provided on the opposite side of the seat back 32. When the third row seat 12 is folded to its cargo carrying position, the foam seat back cushion 42 is placed in the rear stowage well 40 so that the load floor segment 44 forms part of a substantially continuous load floor 46 of the vehicle 10.

As shown in phantom lines in FIG. 2, when the seat back 32 rotates forwardly, the child seat 36 may interfere or prevent folding of the back 32 to the position shown in phantom lines with the load floor is facing generally upwardly. If a child seat 36 is left on the third row seat 12 when it is operated to fold it into its cargo carrying position, the child seat 36 will prevent completion of the folding cycle. To guard against this occurring an operator is required to remain in one of the targeted zones where a person can see that the child seat 36 is on the third row seat 12 and take steps to remove the child seat 36.

Referring to FIG. 3, a vehicle 10 having a third row seat 12 for a three passengers is illustrated. Three weight sensing sensor arrays 50 are provided in the base 30 of the third row seat 12. The weight sensing sensor arrays 50 sense the weight of an object disposed in the third row seat 12. If one of the sensor arrays 50 senses more than a predetermined amount of weight on a vehicle seat, the seat folding control may receive a signal from the sensor arrays 50 to indicate that a foreign object such as a child seat 36 is disposed on the third row seat 12. The weight sensor arrays 50 are actuated upon exceeding a predetermined weight. If an object is placed on the third row seat 12 that does not exceed the predetermined weight for actuation of the sensor arrays 50 no signal will be sent to the folding seat control unit. However, if during the folding cycle the seat back 32 of the third row seat applies pressure to the object on the seat, the weight sensing sensor arrays 50 may be triggered by the weight of the foreign object and the pressure applied to the foreign object downwardly by the seat back 32. The sensor arrays 50 may provide a signal indicating the presence of the foreign object during the folding cycle even if the operator does not notice the foreign object on the seat 12.

Referring to FIG. 4, a diagrammatic view of a the rear seat is provided. A seat control unit 52 that sends and monitors radio frequency transmissions and receptions is illustrated. A rear control button 54 and rear antenna 56 are mounted near the rear portion of the seat 12. A right side control button 58 and right side antenna 60 are provided near the right side door 16. A left side transmitter 62 and left side antenna 64 are provided near the left side door 18. A key fob transmitter 68 is repeated polled whenever the key fob transmitter 68 is within one of the targeted zones 20-24. The key fob transmitter 68 is polled by the vehicle or seat Rf transmitter and receiver system sending a low frequency signal to the key fob 68. The key fob 68 responds with a UHF response signal. The key fob transmitter 68 is required to remain within one of the targeted zones 20-24 because the low frequency signal does not provide a signal of sufficient strength to trigger a response from the key fob transmitter 68. When a person begins a folding or unfolding operation of the third row seat 12, they must be within one of the targeted zone 20-24. Once the seat folding operation begins, the person operating the seat who has the key fob transmitter 68 in their possession must remain within one of the targeted zones 20-24. If the person leaves the targeted zones 20-24 the seat folding operation is interrupted unless the key fob transmitter 68 is returned to a location within one of the targeted zones 20-24.

Figure 5:
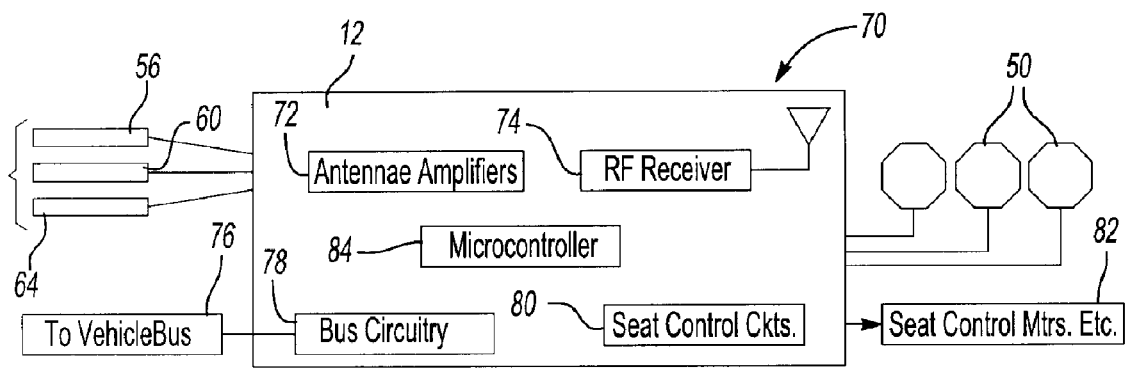
FIG. 5 is a schematic representation of a seat control system made according to one embodiment of the present invention.

Referring to FIG. 5, one embodiment of the seat control system 70 is shown diagrammatically. The seat control system 70 is provided with one or more antenna amplifiers 72 that communicate with the rear antenna 56, right side antenna 60 and left side antenna 64. A seat Rf receiver 74 is provided preferably on or near the third row seat 12 that is adapted to receive Rf signals from the key fob transmitter 68. A vehicle bus 76 is provided as part of the vehicle 10 and a bus interface circuit 78 communicates with the vehicle bus 76. Seat control circuits 80 control the seat control motors 82 that control folding operation of the power seat 12. The three weight sensing sensor arrays 50 are also shown diagrammatically that provide inputs to the seat control system 70.

The seat control system 70 polls the key fob transmitter 68 by sending a low frequency Rf signal to the key fob transmitter 68 that responds with a UHF signal to confirm that the key fob transmitter 68 is within one of the targeted zones. A micro controller 84 initiates and monitors the seat folding process. Seat control circuits 80 control operation and sequencing of the folding operation. The weight sensing sensor arrays 50 provide an input to the micro controller 84 that can prevent operation or interrupt operation of a seat folding operation if a foreign object is detected by the sensor arrays 50. The sensor arrays 50 may send a signal to the micro controller 84 if a foreign object is detected. The micro controller 84 may then interrupt a folding operation by sending a signal to the seat control circuits 80 to stop operation of the seat control motors 82. The bus interface circuitry 78 is linked to the vehicle bus 76 electronically to communicate with the vehicle. The bus circuitry 78 could provide a signal to the vehicle bus to, for example, illuminate a warning light on a vehicle dashboard and thereby indicate that a foreign object has been detected by the weight sensing sensor arrays 50. If either a foreign object is located on the seat or the key fob transmitter 68 is moved out of one of the targeted zones, the micro controller 84 will cause the seat control circuit 80 to stop operation of the seat control motors 82.

Figure 6:
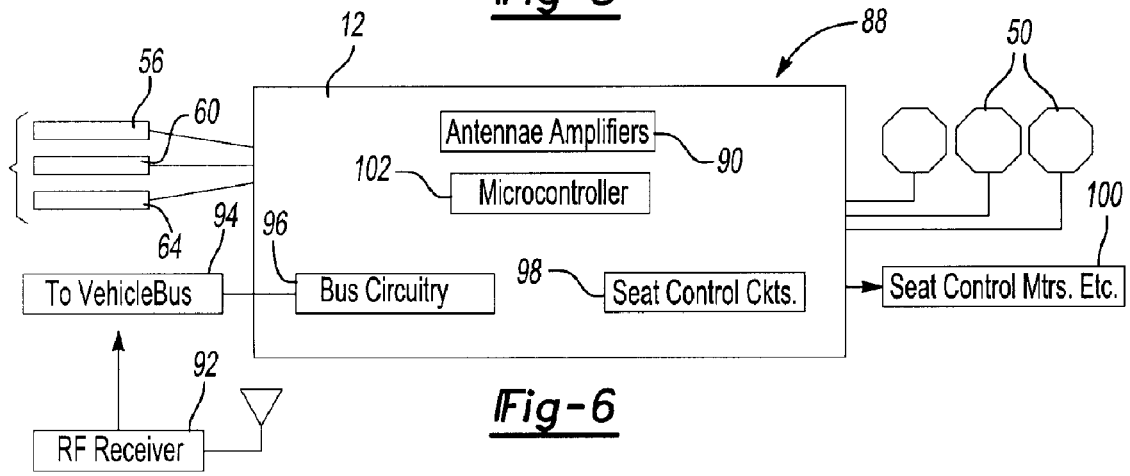
FIG. 6 is a schematic representation of a seat control system made according to another embodiment of the present invention.

Referring to FIG. 6, an alternative embodiment of the seat control system 88 is shown. The seat control system 88 includes an antenna amplifier 90 that is connected to the rear antenna 56, right side antenna 60 and left side antenna 64. A Rf receiver 92 is electronically connected to the vehicle bus 94 to provide responsive signals from a key fob transmitter 68 if it is within one of the targeted zones. A vehicle bus 94 communicates with the bus interface circuitry 96 of the seat control system 88. A seat control circuit 98 is provided to control seat control motors 100. The weight sensing sensor arrays 50 provide an indication as to whether an object of predetermined weight is present in the third row seat 12. This embodiment differs from the embodiment of FIG. 6 in that the seat 12 need not have its own Rf receiver, instead the system utilizes the vehicle Rf receiver 92. The seat polls the key fob transmitter 68 by sending signals from the antenna amplifier 90 to the rear antenna 56, right side antenna 60 and left side antenna 64. The vehicle Rf receiver 92 receives a UHF signal from the transmitter 68 and communicates through the vehicle bus 94 to provide verification that the key fob transmitter 68 is within one of the targeted zones 20-24.

Figure 7:
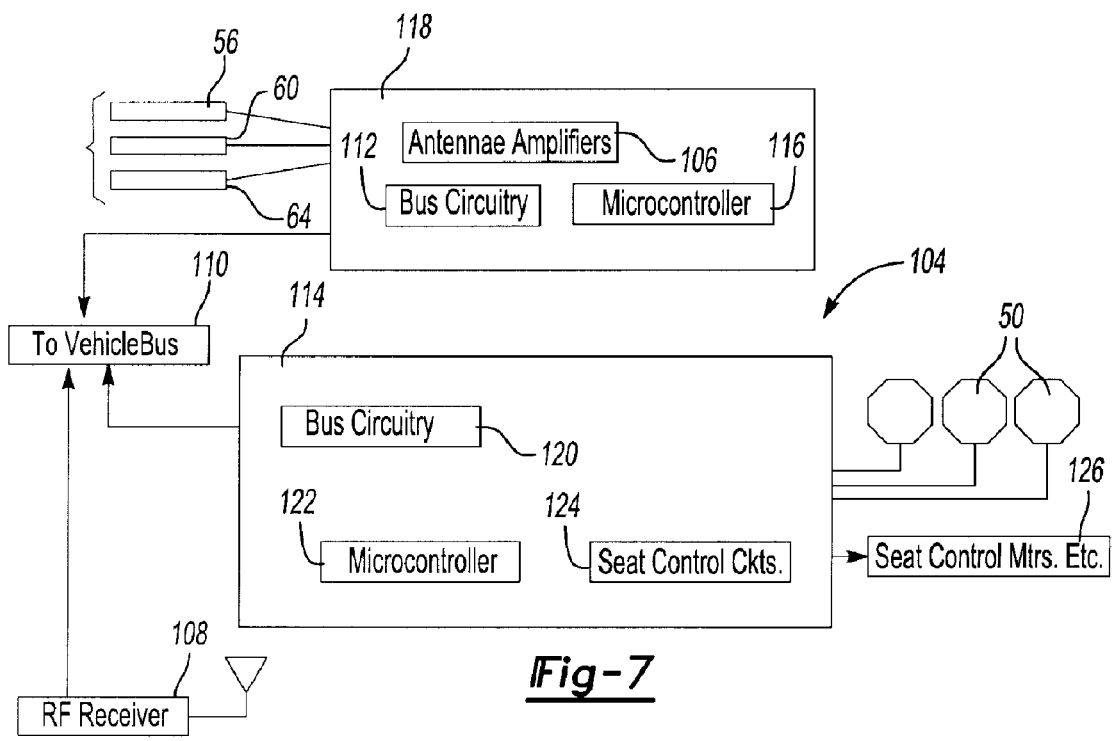
FIG. 7 is a schematic representation of a seat control system made according to another embodiment of the present invention.

Referring to FIG. 7, another alternative embodiment of a seat control system 104 is illustrated. In this embodiment, the antenna amplifiers 106 provide an initiating polling signal through the rear antenna 56, right side antenna 60 and left side antenna 64. The Rf receiver 108 is the vehicle Rf receiver that may provide an input to the vehicle bus 110. Rf bus interface circuitry 112 provides an input to the vehicle bus 110 to enable initiation of a seat folding operation and confirm reception of a signal from Rf receiver 108 to confirm that a person is within one of the targeted zones 20-24. A seat control interface circuit 114 receives inputs from the weight sensing sensor arrays 50. An Rf micro controller 116 is provided as part of a seat Rf receiver 118. The seat Rf receiver 118 receives signals from a source such as a key fob transmitter 68 and confirms that the key fob transmitter 68 is within the desired range or target zones. The seat folding interface circuitry 120 communicates with the seat control circuits 124 and in turn controls the seat control motors 126.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for controlling movement of a seat disposed in a vehicle that has a power driven folding apparatus with a motor that is controlled by an electronic control module, the system comprising:
   a radio frequency (Rf) transmitter assembled to the seat and having at least one antenna located near the seat that establishes at least one targeted zone;
   an Rf receiver system with assembled to the seat;
   a portable Rf transmitter and receiver unit that communicates with the Rf transmitter and the Rf receiver system when the portable Rf transmitter and receiver unit is within one of the targeted zones;
   wherein the Rf transmitter and Rf receiver unit polls the portable RF transmitter and receiver system and provides a signal to the electronic control module during operation of the power driven folding apparatus that only permits the power driven folding apparatus to continue to operate as long as the portable Rf transmitter and receiver unit is in communication with the Rf transmitter and Rf receiver system.

2. The system of claim 1 wherein the portable Rf transmitter and receiver unit is polled by the Rf transmitter sending a low frequency signal to the portable Rf transmitter and receiver unit that responds to the Rf receiver system with a UHF response signal.

3. In the system of claim 1, further comprising at least one manually actuated switch that is actuated to initiate operation of the power driven folding apparatus and wherein the operation of the power driven folding apparatus continues until completed unless the portable Rf transmitter and receiver unit is moved out of the targeted zone.

4. The system of claim 1 wherein the portable Rf transmitter and receiver unit has a plurality of manually actuated switches and wherein any one of the switches may be actuated to interrupt or prevent operation of the power driven folding apparatus.

5. The system of claim 4 wherein at least one of the manually actuated switches or a vehicle mounted switch may be actuated to override the power driven folding seat operation and allow manual folding of the seat.

6. The system of claim 1 wherein the vehicle is provided with a manually actuated switch that may be actuated during operation of the power driven folding apparatus to stop operation of the folding apparatus.

7. In the system of claim 1, further comprising an operator perceptible output mechanism that in the event operation of the power driven folding apparatus is interrupted communicates information regarding the status of the folding apparatus.

8. The system of claim 7 wherein the operator perceptible output mechanism is a display panel on the key fob Rf transmitter and receiver system.

9. The system of claim 7 wherein the operator perceptible output mechanism is a display panel on the vehicle.

10. The system of claim 7 wherein the operator perceptible output mechanism is an audio output.

11. A system for controlling movement of a seat disposed in a vehicle that has a power driven folding apparatus with a motor that is controlled by an electronic control module, the system comprising:
   a radio frequency (Rf) transmitter having a right side antenna secured to the seat adjacent to a right side door to establish a right side targeted zone, a left side antenna secured to the seat adjacent to a left side door to establish a left side targeted zone, and a rear antenna secured to the seat adjacent the rear door to establish a rear area targeted zone;
   an Rf receiver system disposed in the vehicle;
   a portable Rf transmitter/receiver that may be removed from the vehicle and that communicates with the Rf transmitter and the Rf receiver system only when the key fob Rf transmitter and receiver system is within one of the targeted zones;
   wherein the portable Rf transmitter/receiver provides a signal to the Rf receiver that is communicated to the electronic control module during operation of the power driven folding apparatus that permits the power driven folding apparatus to continue to operate.

12. The system of claim 11 wherein the Rf receiver system also provides remote keyless entry that may be controlled by the portable Rf transmitter/receiver in an active mode from a distance that is outside the targeted zone.

13. The system of claim 12 wherein the Rf receiver system also provides passive communication between the portable Rf transmitter/receiver and the Rf receiver system.

14. The system of claim 11 wherein the Rf receiver system is disposed at a location that is remote from the seat.

15. The system of claim 11, further comprising a weight sensing system provided on the seat that detects the presence of a foreign object on the seat and that prevents operation of the power driven folding apparatus if a foreign object is detected.

* * * * *